United States Patent Office

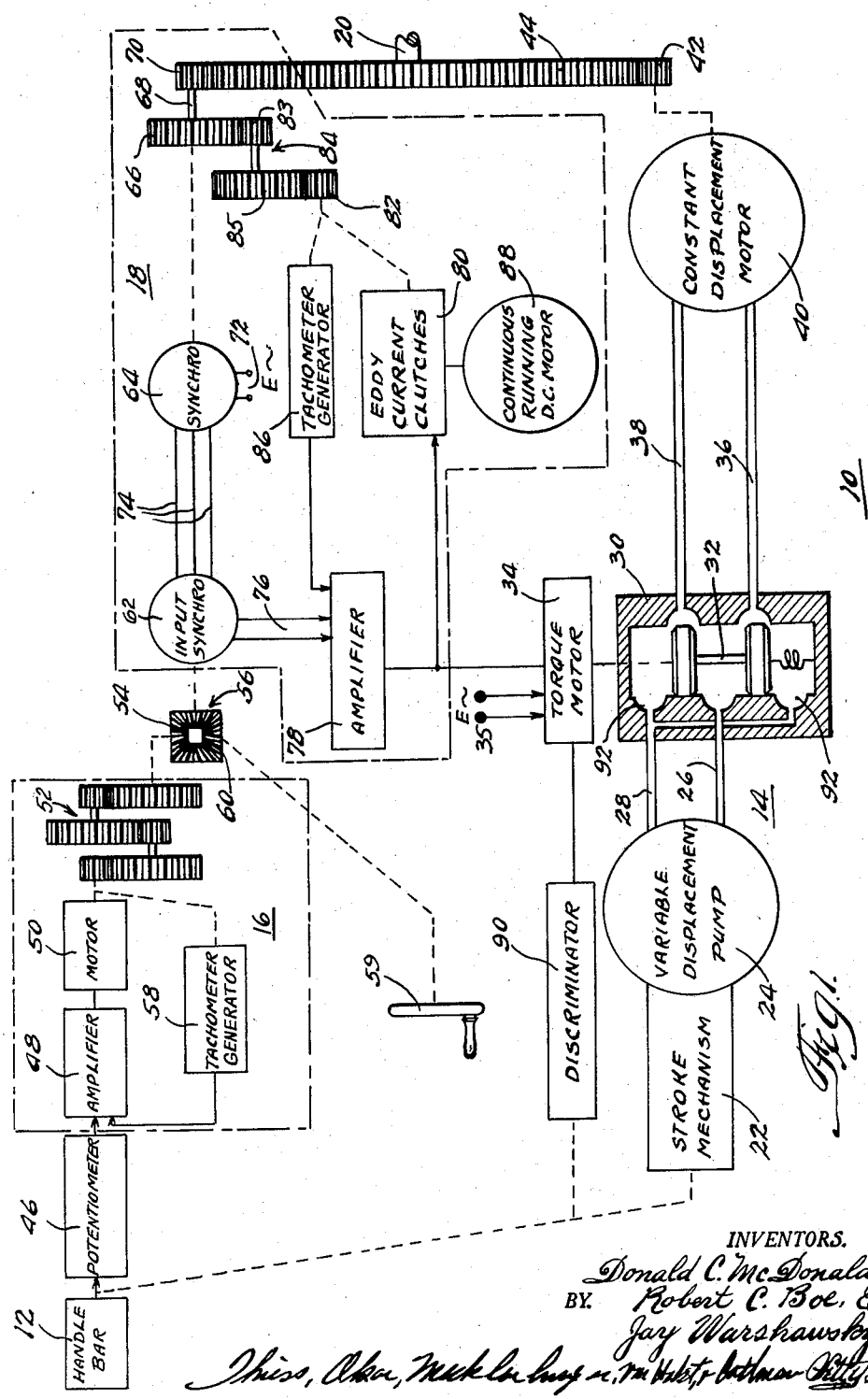

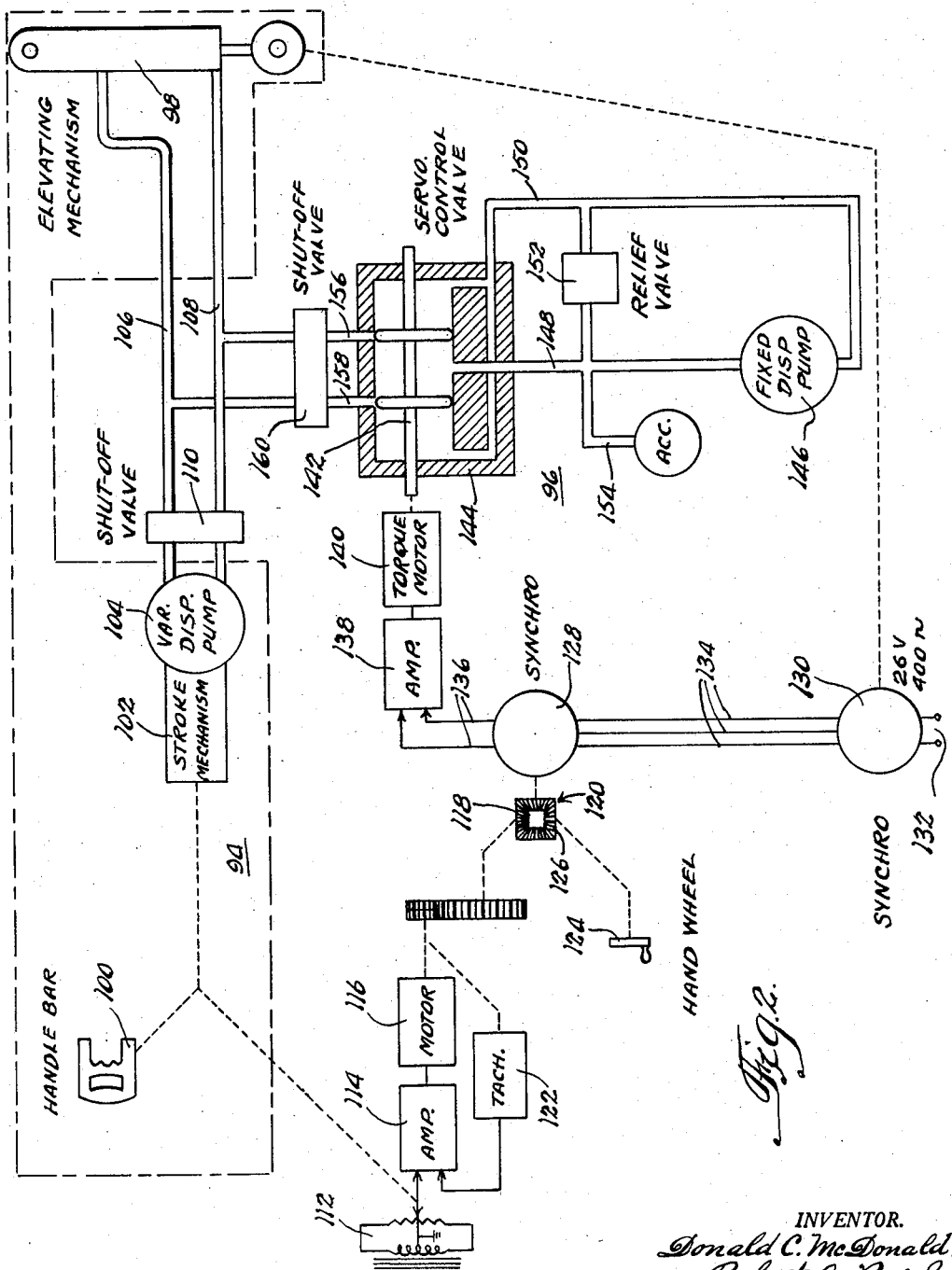

2,871,660
Patented Feb. 3, 1959

2,871,660

REMOTE CONTROL SYSTEM

Donald C. McDonald, Wellesley, Mass., and Robert C. Boe, Des Plaines, and Jay Warshawsky, Chicago, Ill., assignors, by mesne assignments, to Cook Electric Company, Chicago, Ill., a corporation of Delaware Application November 9, 1953, Serial No. 391,056

8 Claims. (Cl. 60—53)

This invention relates to a remote control system and more particularly to improved means for stabilizing the operation of various remote control systems.

It is an important object of this invention to provide means for increasing the speed and sensitivity of a control system while providing improved steady-state stability.

It is another object of this invention to provide means for controlling the operation of various mechanical elements by providing a follow-up system operable in cooperation with a conventional remote controller.

Systems have heretofore been proposed for remotely controlling various phenomena such as position, temperature, velocity, and the like which have utilized either a direct control in which the magnitude of the variable operated upon bears no sensible relationship to the position or signal of the controlling mechanism or follow-up systems wherein such a relationship exists. The former type of system will be referred to as remote control systems generally and is typified by a switch or valve controlling a motor or pump position. Control of variables is often accomplished by the follow-up type of system which differs from the remote control system in that the position of an output bears a predetermined relationship to the position of a controlling element. Such follow-up systems may utilize direct transmission of a signal which is characteristic of the instantaneous value of the variable or may utilize a servomechanism or comparison system in which an error signal is transmitted between the controller and the controlled element, the magnitude of the error signal depending upon the positional discrepancy between these two elements. Both the remote control and follow-up systems have certain inherent advantages while displaying certain detrimental characteristics. The remote control system may generally be designed to respond rapidly to input signals but will not provide compensation for transient effects, drift, or the application of external error-producing forces on the system and is not adapted for automatic operation.

The follow-up type of control, on the other hand is generally more complicated in construction than the remote control system and is less rapid in response to input signals but will maintain the relative position of a controller and controlled element irrespective of the external or transient forces applied to the controlled element or the drift which may be inherent in the system and may be operated automatically from an instrument output or the like.

One particular system for which this invention is well adapted is the remote operation of a tank turret, either in traverse or in elevation. It is generally desired in such devices that the turret be positionable in the minimum possible time whereby the accompanying firearm may be placed on the target as rapidly as possible. It is further desirable that once the turret is positioned, this position will be maintained irrespective of the effects of mechanical forces resulting from the motion of the associated tank or the effect of the wind on the turret. This stabilization may be desired with respect to either the tank hull or a fixed datum in space. To accomplish these diverse ends with the minimum equipment a system is proposed by this invention which will function both as a directly actuated remote controlled and a follow-up system.

It is therefore a further object of this invention to provide a control system characterized by increased accuracy and speed of response.

It is another object of this invention to provide a follow-up system which exhibits smooth tracking characteristics over an increased speed range while possessing improved static accuracy.

It is a further object of this invention to provide a system capable of smooth tracking over a 1500 to one speed range with a static accuracy of 0.1 milliradian.

It is another object of this invention to provide an improved control system whereby increased positional accuracy may be maintained during both transient and steady-state operation.

It is a further object of this invention to provide an improved control system wherein the position of a controlled element may be readily maintained with respect to any predetermined datum.

It is still another object of this invention to provide an improved control system having greatly improved stability under both transient and steady-state conditions.

It is another object of this invention to provide an improved control system utilizing multiple mode operation.

It is still a further object of this invention to provide a multiple mode control system wherein operation may be maintained in a preselected mode to the exclusion of other modes of operation whereby a system having increased safety and reliability is provided.

Further and additional objects of this invention will become manifest from a consideration of this specification, the accompanying drawings, and the appended claims.

In one particular embodiment of this invention an improved control system is provided having a controller, a positioning and low velocity drive to maintain the load in determinable positions, and a high velocity drive actuated by the controller to position said load rapidly.

More particularly a system is hereby provided whereby a controller will actuate a high velocity drive to energize a load, the degree and direction of application of energy to the load from the high velocity drive being determined by the degree and direction of displacement of the controller; an auxiliary low velocity drive also being provided in conjunction with a follow-up system whereby the follow-up system will generate an output corresponding to various positions of the load and determinable by the controller to effect a comparison between the position of the load and the output of the follow-up system to energize the low velocity drive and accurately position the load and stably maintain the position thereof under steady-state and quiescent conditions.

For a more complete understanding of this invention reference should be made to the accompanying drawings, wherein Fig. 1 illustrates one embodiment of this invention utilizing a hydraulic high velocity drive in conjunction with an electrical low velocity drive; and Fig. 2 illustrates a second embodiment of this invention utilizing high and low velocity hydraulic drives connected in parallel to energize a load.

Referring now to the drawings and more particularly to Figure 1, a control system 10 is provided having, in effect, two independent channels of servomotor control between a controlling handlebar 12 and load output shaft 20. One channel may be comprised of a bi-directional velocity servomotor system and a bi-directional closed-loop servomotor system. The bi-directional velocity servomotor system includes handlebar 12 as its input element, the velocity servomotor apparatus 16, and the differential gear assembly 56 as its output element. The bi-directional closed-loop servomotor system includes the differential gear assembly 56 as its input element, servomotor control apparatus 18, and shaft 20 as its output element. The other control channel utilizes hydraulic apparatus and is comprised of a high-power bi-directional servo-motor system made up of handlebar 12, stroke mechanism 22, variable-displacement pump 24, four-way valve 30, constant displacement motor 40, and output shaft 20. The torque motor 34 and the discriminator 90 comprise means intercoupling the two control channels for bringing the high-power control channel into operation only when additional power is required to assist the other control channel in preventing the occurrence of more than a predetermined magnitude of discrepancy between a desired position, as represented by the rotative position of the armature of the input synchro 62, and the actual position of the output shaft 20. The torque motor 34 is actuated by an error signal continuously representing any positional discrepancy. This signal is developed in the armature of input synchro 62 and amplified by amplifier 78 before being applied to the torque motor 34. From the foregoing it should be apparent that the velocity servomotor apparatus 16 is, in effect, a velocity servomechanism, and the servomotor control apparatus 18 is, in effect, a low-velocity drive having less power than the aforedescribed hydraulic control channel. For convenience, therefore, the phrases velocity servomechanism and low-velocity drive will be used in referring to the velocity servomotor apparatus 16 and the servomotor control apparatus 18, respectively.

The controller 12 in this embodiment is a simple handlebar type member which is mechanically connected to a stroke mechanism 22 in the high velocity drive 14. The stroke mechanism controls the instantaneous displacement of a variable displacement hydraulic pump 24 which will force hydraulic fluid under determinable pressure into the lines 26 and 28 in a direction determined by the position of handlebar 12. Such a stroke mechanism and variable displacement pump are well known in the prior art, and therefore the details thereof are omitted herein. The hydraulic lines 26 and 28 terminate in a four-way open-center valve 30 which has a piston 32 which is spring biased to one extreme of travel but is maintained under quiescent or steady-state conditions in the central position shown by energization of one winding of a torque motor 34 from a fixed power source through conductor 35. If it is desired to utilize the high velocity drive exclusively and independently of the low velocity drive, the piston 32 will be positioned at one extreme of travel and under that condition the hydraulic lines 26 and 28 will be, in effect, directly connected to hydraulic lines 36 and 38 which terminate in a constant displacement motor 40. The constant displacement motor 40 is mechanically connected to a spur gear 42 which is in engagement with an output spur gear 44 fixed to output shaft 20.

Thus the system above described may be utilized as a conventional remote control system in which the direction of displacement of handlebar 12 will determine the direction of pressure from the variable displacement pump 24 and consequently the direction of rotation of the constant displacement motor 40 energized from the hydraulic lines connecting said motor to the pump 24. Furthermore the degree of displacement of handlebar 12 will control the degree of operation of stroke mechanism 22, and in turn the pressure and volume of hydraulic fluid available from the variable displacement pump 24 will be determined. There will be, in this type of operation, no correlation of any kind between the position of the handlebar 12 or any other controller element and that of the output shaft 20. Thus if some external force or transient effect causes the shaft 20 to be displaced from the position as determined by an operator actuating handlebar 12 there will be no signal generated to indicate this discrepancy nor any correcting force produced. To provide stability and the correcting forces necessary to maintain the output shaft 20 in a desired position, the velocity servo 16 and low velocity drive 18 are provided. The handlebar 12, in addition to positioning the stroke mechanism 22, will also position a potentiometer 46, the output of which is applied to the input of an amplifier 48. The output of the amplifier 48 in turn drives a variable speed motor 50 which is connected through spur gears 52 to one element 54 of a differential 56. While the differential 56 is here symbolically shown as a four-beveled gear differential, it is believed clear that various types of differentiating mechanisms may be substituted therefor without departing from the spirit of this invention. A tachometer generator 58 is driven from the output of motor 50 whereby a voltage is generated which is directly proportional to the output speed of motor 50. This voltage is fed from tachometer generator 58 into the amplifier 48 whereby a closed loop is formed. The output of tachometer generator 58 will be compared with the output of potentiometer 46 to produce a balance therebetween whereby the speed of rotation of motor 50 will bear a direct predetermined relationship to the position of potentiometer 46 and consequently to the degree and direction of displacement of handlebar 12. Such a system of producing an output velocity proportional to an input displacement may be accomplished by various means, only one of which is here shown, and therefore it is not believed necessary to illustrate or describe the details of the various elements of the system. A hand wheel 59 is also provided for manually controlling the differential 56. The hand wheel 59 is mechanically connected to a second bevel gear 60 of the differential. The output of the differential 56 is utilized to position the armature of an input self-synchronous repeater 62. A second self-synchronous repeater or synchro 64 is provided in the low velocity drive 18, the armature of which is mechanically connected to a spur gear 66 driven through shaft 68 and spur gear 70 from the output spur gear 44. The synchro 64 has input terminals 72 which are energized from a source of A. C. voltage to provide voltage on a single-phase armature winding of the synchro. A three-wire signal is generated in the stator of synchro 64 which will be characteristic of the position of the armature thereof and will be transmitted over conductors 74 to the three-wire stator of the input synchro 62. The input synchro 62 will generate a voltage in its single-phase armature winding which bears a predetermined relationship both to the signal transmitted thereto from the synchro generator 64 and the armature position of synchro 62 as determined by differential 56. The output signal of synchro 62 is applied through conductors 76 to an amplifier 78 which will in turn increase the magnitude of the electrical signal to provide sufficient power to energize the torque motor 34 and a pair of counter-rotating eddy current clutches 80. When the input synchro 62 and synchro generator 64 are in positional agreement the output voltage through conductors 76 will be zero. Thus the eddy current clutches 80 will be deenergized and the torque motor 34 will maintain the piston 32 of hydraulic valve 30 in the central position illustrated. If the position of the armature of input synchro 62 relative to the armature of synchro generator 64 is changed either by operation of the hand wheel 59, the handlebar 12, or by an external force applied to output shaft 20, a signal is applied to amplifier 78 from the armature of input synchro 62 through conductors 76. This signal is increased in magnitude by amplifier 78 and applied to a preselected one of the eddy current clutches 80 to drive a spur gear 82 which is connected through gear train 84 to the output gear 44. A tachometer generator 86 is also driven from the output of the eddy current clutches 80 and generates a signal proportional to speed which is fed back into the amplifier 78 to produce output damping. The power for driving spur gear 82 through eddy current clutches 80 is provided by a D. C. motor 88 which is in continuous operation. By providing the continuously running D. C. motor and a pair of alternately energizable eddy current clutches, a system is provided which is substantially free of any backlash characteristics. The only gears which will be reversed in direction of operation in this embodiment are the spur gears of gear train 84. Backlash present in these gears may be substantially eliminated by providing split pinions 82 and 83 as here illustrated wherein the two adjacent elements of the gear are spring loaded to engage both faces of respective teeth in the associated spur gear 85 and 66 to prevent freedom of motion between the associated gear faces.

The output of amplifier 78 is also applied to the torque motor 34. The torque motor may be any one of several well-known linear devices adapted to produce motion substantially proportional to an electrical voltage. A simple device of this type is a solenoid having a spring-loaded iron core therein which will exhibit motion of the iron core against the force of the spring loading, the degree of motion depending upon the degree of energization. A discriminator 90 is provided which controls the direction of application of power to the torque motor 34 so that the outputs of the low velocity and high velocity drives will always be in directional agreement. The discriminator 90 may be a simple reversing switch actuated by motion of the handlebar 12 which will automatically reverse the application of power to the torque motor 34 from the amplifier 78 for reversal of handlebar displacement.

The operation of the above-described structure will now be recited in detail. If an operator desires to position the output shaft 20 the handlebar 12 is actuated in a preselected direction which will move potentiometer 46 to generate a signal in the velocity servo 16 which will in turn energize the low velocity drive 18. The displacement of handlebar 12 will also actuate discriminator 90 and stroke mechanism 22 in the hydraulic high velocity drive 14. The degree of displacement of handlebar 12 will determine the mode of operation which is produced and the relative contribution of the two independent drives 14 and 18 in producing the total energy output. If the displacement of handlebar 12 is small, the high velocity drive 14 which has a central quiescent range will not be actuated, and the velocity servo 16 and low velocity drive 18 will function to drive the output shaft 20. Displacement of handlebar 12 will create a voltage in potentiometer 46 which will actuate motor 50 at a speed determined by the output voltage of tachometer 58. This will drive differential 56 to move the armature of input synchro 62 at a predetermined rate which will produce an output voltage in conductor 76 proportional to the displacement of the armature of input synchro 62 from that of synchro generator 64. This signal will be amplified and applied to the eddy current clutches 80 which will connect the D. C. motor 88 to the output shaft 20 to drive the output shaft in the desired direction and bring the armature of synchro generator 64 toward positional agreement with the armature of input synchro 62. Thus as long as the handlebar 12 is displaced a small amount, the velocity servo 16 will drive the armature of input synchro 62 at a velocity determined by the displacement of handlebar 12. The displacement of the armature of synchro 62 will in turn provide a signal for the eddy current clutches 80 which will drive the output shaft 20 from the continuous running D. C. motor 88 at the desired velocity substantially the same as the output of velocity servo 16. When the handlebar 12 is again placed in the neutral position velocity servo 16 will come to rest, and a position will be established for the differential 56 and armature of the input synchro 62. If, as a result of the application of any external forces, the position of shaft 20 is changed, the armature of synchro generator 64 will also experience a positional change and a signal will be generated which will be applied to amplifier 78 and subsequently to eddy current clutches 80 which will cause D. C. motor 88 to reposition shaft 20 to correspond to the position of differential 56. A single synchro may be utilized as here shown, or a pair of cooperating synchro systems may be utilized for fine and coarse control to remove positional ambiguity which may otherwise result from the geared down operation of a single synchro as here illustrated.

When handlebar 12 is displaced from the neutral position to produce more rapid motion of the output shaft 20 the stroke mechanism 22 is actuated which will in turn actuate the variable displacement pump 24 to set the high velocity drive 14 in operation. At the same time the velocity servo 16 will function in the manner above described, and as a result of the large displacement of handle bar 12 a relatively large positional discrepancy will be produced between the armatures of input synchro 62 and synchro generator 64, and consequently a large signal will be applied to amplifier 78. This will cause the torque motor 34 to be actuated, the discriminator 90 determining the direction of actuation, so that piston 32 will be displaced from the normal central position in a direction appropriate to produce hydraulic pressure to drive the constant displacement motor 40 in the desired direction to aid the low velocity drive 18 to rapidly drive output shaft 20 and correct the positional displacement between the shafts of input synchro 62 and synchro generator 64 more rapidly. The four-way valve 30 is provided with apertures 92 which provide an open-center position whereby hydraulic fluid may pass between lines 36 and 38 without passing through the variable displacement pump 24. Thus when the piston 32 is in its central position the constant displacement motor 40 is not effectively sealed against rotation and the output gear 44 may be independently driven from the low velocity drive 18. The constant displacement motor 40 and hydraulic lines 36 and 38 provide viscous damping for the low velocity drive 18, thus improving performance of that system. Similarly, though the torque motor 34 has not actuated the piston 32 to displace it from its central position, the variable displacement pump 24 may pass hydraulic fluid through lines 28 and 26 to pass the piston 32 without substantially altering the pressure in output lines 36 and 38. As motion of the piston 32 is approximately proportional to the output of amplifier 78 as applied to torque motor 34, increasing positional discrepanices between the input and output of the low velocity drive will produce increasing displacement of piston 32 and provide a gradual shift from the first mode of operation utilizing low velocity drive 18 to the higher mode of operation utilizing high velocity drive 14. By providing this smooth transition between modes of operation, greatly improved operation is provided with greater stability and more rapid response than was possible with the systems heretofore known.

The alternate embodiment illustrated in Fig. 2 operates on the same multiple mode principle as that above described but utilizes two hydraulic systems, a high velocity system 94, and a low velocity system 96 which are connected in parallel to drive a common load 98. In this embodiment the high velocity drive 94 is substantially identical to the high velocity drive 14 of Fig. 1. A handlebar 100 is provided which mechanically drives a stroke mechanism 102 to actuate a variable displacement pump 104 to provide hydraulic pressure in lines 106 and 108 to drive any appropriate mechanism 98. As here shown, the mechanism 98 is a hydraulic ram utilized in an elevating mechanism for a large mass such as a large caliber tank-mounted gun, but the elevating mechanism may be replaced by a constant displacement motor such as that above described with respect to Fig. 1. A shut-off valve 110 is provided in the lines 106 and 108 whereby the variable displacement pump 104 may be cut off from the system in the event of mechanical failure and the low velocity drive 96 may be utilized independently. The handlebar 100 is also employed to actuate a potentiometer 112 which generates a signal, the direction and magnitude of which are determined by the direction and magnitude of displacement of the handlebar. This signal is applied to an amplifier 114 which in turn drives a variable speed motor 116, the output of which drives one bevel gear 118 of a differential 120. The output of motor 116 also drives a tachometer generator 122 to generate an electrical signal proportional to speed which is compared with the output of potentiometer 112 to produce an output velocity from motor 116 bearing a predetermined relationship to the displacement of handlebar 100. This velocity servomechanism was explained in greater detail with respect to Fig. 1. A hand wheel 124 is also provided in this embodiment to control the position of a second bevel gear 126 of differential 120 whereby the differential position may be manually controlled. The output of differential 120 is connected to the shaft of an input synchro 128 which is utilized in conjunction with the synchro generator 130. The armature of generator 130 is mechanically connected to the elevating mechanism 98 whereby the position of the armature bears a predetermined relationship to the position of the elevating mechanism. An A. C. voltage is applied to synchro generator 130 at terminals 132 to produce a three-wire variable magnitude signal in lines 134 which is characteristic of the position of said armature. This three-wire signal is applied to the stator windings of input synchro 128, and an output signal is produced therefrom in conductors 136, the output signal bearing a predetermined relationship to both the input three-wire signal and the position of the synchro armature as determined by differential 120. The output of synchro 128 is applied to amplifier 138, the output of which energizes a torque motor 140 to produce linear motion in a piston 142 as described with respect to Fig. 1. The piston 142 is the moving element of a four-way closed-center valve 144 which is the controlled element of the low velocity drive 96. The low velocity drive 96 has as a source of energy a fixed displacement pump 146 which is connected through hydraulic lines 148 and 150 to the four-way valve 144. A relief valve 152 connected between the lines 148 and 150 and an accumulator 154 are also provided in the low velocity hydraulic system.

It is believed manifest from the construction and disposition of the valve 144 that the direction of displacement of piston 142 will determine the direction of hydraulic flow in the output lines 156 and 158. If the piston 142 is displaced to the left in Fig. 2 hydraulic line 150 will be connected directly to output line 156 while line 148 is connected to line 158. If the torque motor 140 is oppositely energized, the piston 142 is actuated to the right in Fig. 2 and hydraulic line 150 is directly connected to output line 158 while line 148 is connected to output line 156. Furthermore, as the torque motor 140 will control the motion of piston 142 and displacement of the piston is substantially proportional to displacement of the armatures of the two synchros 128 and 130, the valve mechanism will provide controlled pressure in the output lines 156 and 158, the magnitude and direction of pressure being determined by the magnitude and direction and length of time of displacement of handlebar 100, whereby motion of the elevating mechanism 98 will be at a speed and direction as dictated by an operator controlling handlebar 100. Output lines 156 and 158 are connected to hydraulic lines 106 and 108 which extend from the variable displacement pump 104 to the elevating mechanism 98. Thus the high and low velocity drives are connected in parallel and their output will be connected in aiding relationship at all times. A shut-off valve 160 is disposed in lines 156 and 158 whereby the low velocity drive 96 may be isolated from the system in the event of failure thereof, and the high velocity drive 94 may be employed independently.

The operation of the embodiment of Fig. 2 is similar to that of the embodiment of Fig. 1 and is generally of a multiple mode type. Small displacements of handlebar 100 will cause the low velocity drive 96 to be actuated to linearly displace the piston 142 in accordance with the signal generated by the synchro system and will bring the elevating mechanism 98 into agreement with a position as dictated by the differential 120. For larger displacements of the handlebar 100 which will correspond to an operator's demand for more rapid velocities, the stroke mechanism 102 will actuate variable displacement pump 104 to produce a direct drive of the elevating mechanism 98 therefrom. This direct drive will be more rapid and capable of greater accelerations than the follow-up system utilized in the low velocity drive 96 but will not maintain stability during quiescent periods and will not correct for a drift or displacements resulting from the application of external forces to the load.

While in both of these embodiments the differentials have maintained a datum as established by the operator which is relative to the condition of the supporting structure or hull, it is also possible by this invention to stabilize the system with respect to a space datum. To accomplish this a gyro system will be employed to establish such a space datum, and the signal from the gyro may either be applied directly to the electrical system through an additional synchro or may be utilized to drive the fourth bevel gear in the differentials 56 or 120.

Further modifications of this invention will become manifest to one skilled in the art and are believed to be within the spirit and scope of this invention. The invention as contemplated is broadly directed to the remote control of a movable element by two drive systems, one of which is directly controlled by an operator and the second of which is a follow-up system adapted to maintain position and velocity agreement between the driven element and the controller. Furthermore, this invention contemplates the integration of these two systems whereby a multiple mode operation is provided which will have optimum speed of response for large positional displacements and velocity demands and will have maximum stability and minimum error for low velocity motion and steady-state position maintenance.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. In combination, a movable load device, a movably mounted manual controller having a neutral position and being manually displaceable therefrom to any desired extent within a predetermined range, first bi-directional motive means coupled to said load device and having power sufficient to move said load device rapidly and with substantial acceleration, second bi-directional motive means coupled to said load device and having power lower than that of said first motive means but sufficient to move said load device slowly, and control means interconnecting said manual controller and said first and second motive means operative responsively to any displacement of said controller from said neutral position to feed energy from said second motive means to said load device for moving the same and operative responsively to displacement of said manual controller from said neutral position greater than a predetermined amount to feed additional energy to said load device from said first motive means for moving the same rapidly, said control means including a closed-loop servomotor system containing the said second motive means, the said closed-loop system being controlled by the position of said load device such that energy is fed to said load device from said second motive means responsively to movement of said load device which is unaccompanied by displacement of said manual controller, said last-mentioned energy being fed to said load device in the direction tending to oppose and cancel said last-mentioned movement of said load device.

2. The combination of claim 1 having additionally a manually operable position-control device for said closed-loop servomotor system, movement of said position-control device being operative to actuate said closed-loop system and thereby to cause said second motive means to supply energy to said load device for producing a corresponding movement thereof.

3. The combination of claim 1 wherein said control means further comprises separate power-regulating means for each of said first and second motive means operative to control the power output of said respective motive means in accordance with the degree of displacement of said controller from said neutral position.

4. A dual-mode driving system comprising: a positionable load element; a controller displaceable through a range on either side of a neutral position; an intermediate positionable element; means coupled to the said controller and the said intermediate element for causing movement of the latter in a direction and at a rate determined by the direction and magnitude, respectively, of any displacement of the said controller from the said neutral position; a closed-loop servomotor system coupled to and including the said intermediate element and the said positionable load element for establishing and maintaining the position of the latter as a function of the position of said intermediate element, the said closed-loop system further including means for producing an error-signal representing the direction and magnitude of any displacement of the said load element relative to the position of the said intermediate element; a further bi-directional servomotor system having greater motive power than the said closed-loop servomotor system coupled to and including the said controller and said positionable load element; and means coupled between the said error-signal producing means and the said further servomotor system for operating the said further system in the direction required to reduce the said error whenever the error signal exceeds a predetermined magnitude, and for terminating operation of the said further system whenever the error signal becomes less than a predetermined magnitude.

5. A dual-mode driving system as represented in claim 4 further comprising a manually-operable position-control device coupled to the said intermediate element for actuating the said closed-loop servomotor system and, thereby positioning the said load element.

6. A dual-mode driving system comprising: a controller having a range of displacement on either side of a neutral position; a positionable load device; a positionable element; a bi-directional servomotor system coupled to and including the said controller and the said element for causing movement of the latter in a direction and at a rate determined by the direction and magnitude, respectively, of any displacement of the said controller from the neutral position; a closed-loop servomotor system coupled to and including the said element and the said positionable load device for establishing and maintaining the position of the latter as a function of the position of said element, the said closed-loop system further including means for producing an error-signal representing the direction and magnitude of any displacement of the said load element relative to the position of the said element; a further bi-directional servomotor system having greater motive power than the said closed-loop servomotor system and including the said controller and said load device, the said further system having a variable-displacement hydraulic pump coupled to the said controller such that the output power of the said pump is a direct function of the magnitude of controller displacement from the said neutral position, a bi-directional hydraulic motor coupled to the said load device, and a valve coupled to the said pump and the said motor for cutting off or reversing the flow of hydraulic fluid between the said pump and the said motor; and means coupled between the said error-signal producing means and the said valve for operating the said further system in the direction required to reduce the said error whenever the error-signal exceeds a predetermined magnitude, and for terminating operating of the said further system whenever the error signal becomes less than a predetermined magnitude.

7. A dual-mode driving system as represented in claim 6 further comprising a manually-operable positioning control coupled to the said positionable element for actuating the said closed-loop servomotor system, and, thereby, positioning the said load element.

8. A remote control system having controlling and controlled elements and including apparatus automatically operative to minimize any error between a desired position established by the said controlling element and an actual position of the controlled element, the said system comprising: a controlling element displaceable through a range on either side of a neutral position; a load element to be controlled in response to the said controlling element; a first remote-control channel coupled to and including the said controlling and controlled elements, the said first channel including a positionable element, means coupled to the said controlling and positionable elements for establishing the position of the latter in response to the former, and a closed-loop servomotor system coupled to and including said positionable and load elements for minimizing any discrepancy between the respective positions of the two last-mentioned elements; means constituting a second remote-control channel, the said means including further means coupled to the said controlling element for producing a signal representing the direction of movement of the said controlling element, and further including a bi-directional servomotor system coupled to the said further means and coupled to and including the said controlling and load elements; and means coupled to the said closed-loop system, the said further means, and the said bi-directional servomotor system for actuating the latter whenever the said discrepancy, if any, exceeds a predetermined magnitude.

References Cited in the file of this patent

UNITED STATES PATENTS

| | | |
|---|---|---|
| 433,184 | Pickles | July 29, 1890 |
| 1,201,105 | Farrell | Oct. 10, 1916 |
| 2,474,739 | Ingoldby | June 28, 1949 |
| 2,526,665 | Hull et al. | Oct. 24, 1950 |
| 2,604,613 | Klass | July 22, 1952 |
| 2,640,370 | Murphy | June 2, 1953 |